E. E. TOWLE.
TRUCK FOR AGRICULTURAL IMPLEMENTS.
APPLICATION FILED AUG. 28, 1919.
1,376,591.
Patented May 3, 1921.
2 SHEETS—SHEET 2.
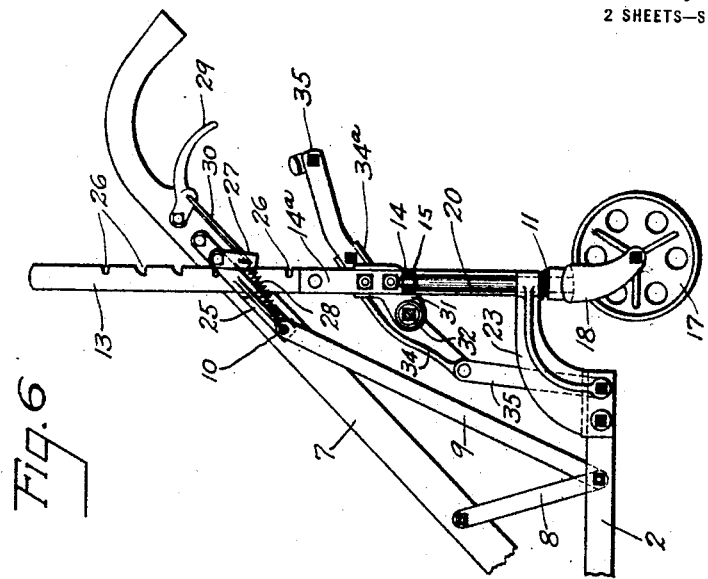
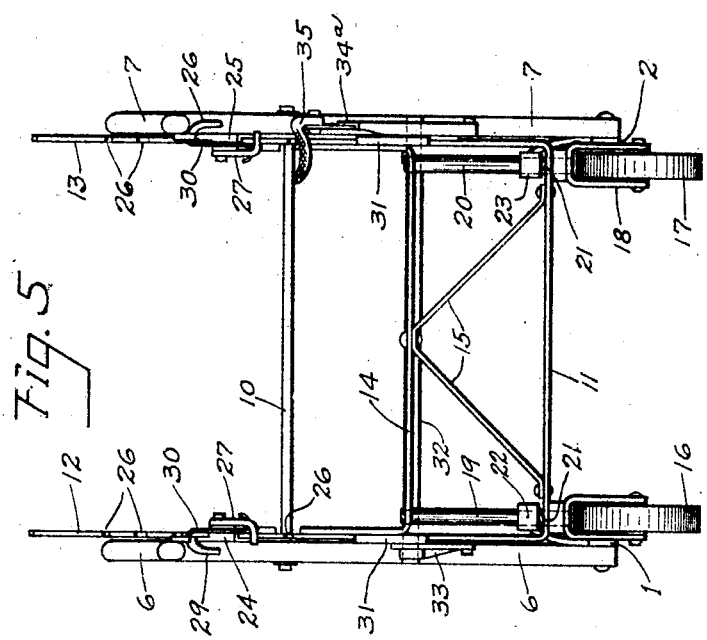
Inventor
Elmer E. Towle
By Staley & Bowman
Attorneys

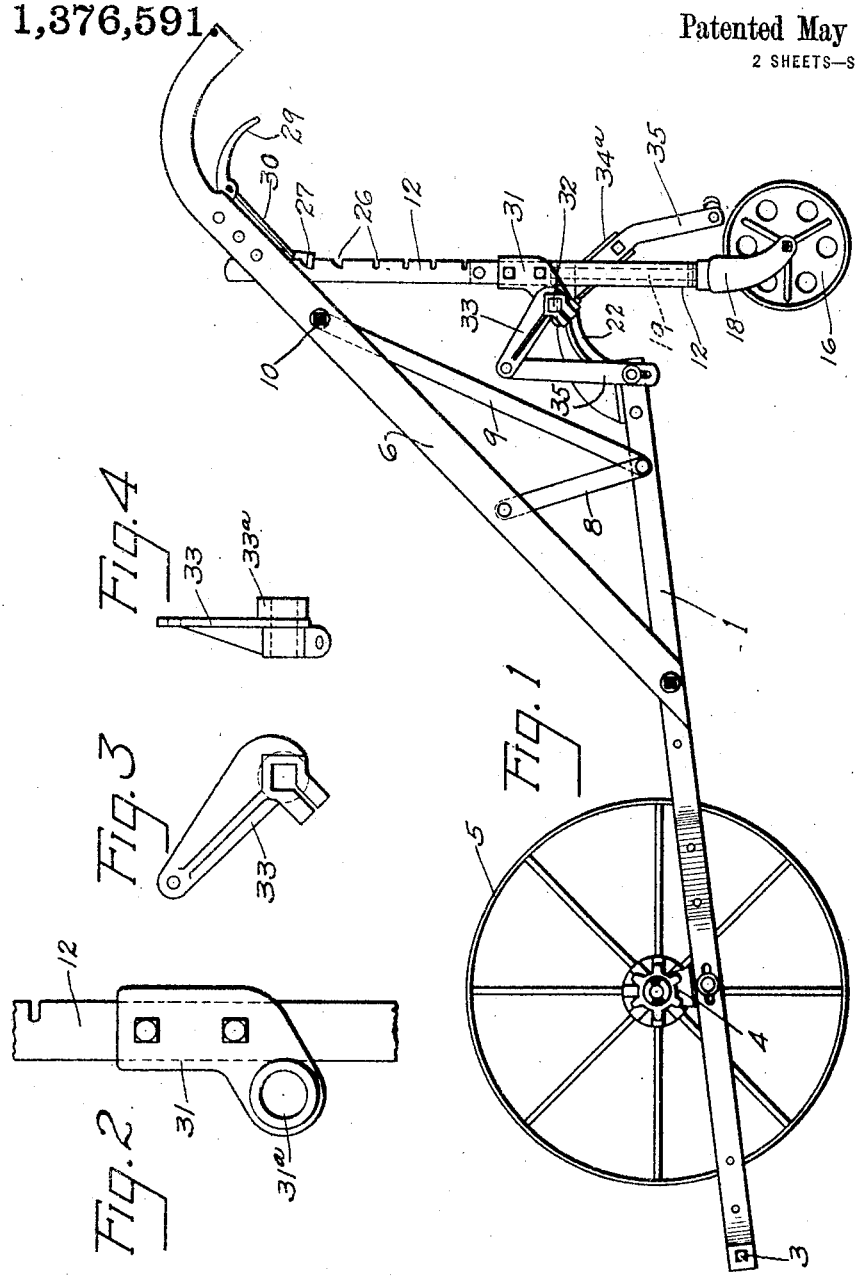

UNITED STATES PATENT OFFICE.

ELMER E. TOWLE, OF RICHMOND, INDIANA, ASSIGNOR TO THE AMERICAN SEEDING MACHINE COMPANY, OF SPRINGFIELD, OHIO, A CORPORATION OF OHIO.

TRUCK FOR AGRICULTURAL IMPLEMENTS.

1,376,591.     Specification of Letters Patent.     Patented May 3, 1921.

Application filed August 28, 1919. Serial No. 320,436.

*To all whom it may concern:*

Be it known that I, ELMER E. TOWLE, a citizen of the United States, residing at Richmond, in the county of Wayne and State of Indiana, have invented certain new and useful Improvements in Trucks for Agricultural Implements, of which the following is a specification.

This invention relates to improvements in truck attachments for grain drills of the type known as five disk drills.

The object of the invention is to provide a truck of the type referred to which will enable the operator to readily and quickly raise or lower the drill frame for gaging the depth of planting and also for lifting the furrow openers entirely out of the ground when turning the machine at the end of a row or for transportation purposes.

A further object of the invention is to provide a truck with the caster wheels so arranged that the machine may be readily and easily swung sidewise in either direction by the operator regardless of whether the machine is moving forward or standing idle, the caster wheels readily responding to the sidewise movement of the machine; a further and more specific object in this connection being to so arrange the stems of the caster wheels that they will remain substantially perpendicular at all times, thus allowing free movement of the drill in any direction, the caster wheels freely adjusting themselves to such movement.

A further object of the invention is to provide a truck with the caster wheels so arranged as to maintain the drill frame and parts carried thereby, particularly the furrow openers, at an even level with respect to the ground; the arrangement being such that the flopping about of the caster wheels due to the unevenness of the ground, will not affect the height or level of the parts with relation to the ground.

A further object of the invention is to provide raising and lowering mechanism which will be out of the way of and not interfere with the free movement of the operator, more particularly the operating lever forming a part of such mechanism.

A further object of the invention is to provide a truck which will enable the machine to be turned in comparatively small space and with great ease.

Further objects of the invention will appear from the following description and accompanying drawings.

In the said drawings:—

Figure 1 is a side view of so much of an implement as is necessary to illustrate the invention with my improved truck applied thereto, the parts being in raised position.

Fig. 2 is a side view of one of the rock shaft supporting brackets.

Fig. 3 is a side view of one of the lifter arms.

Fig. 4 is a top plan of the same.

Fig. 5 is an end view of the parts shown in Fig. 1 shown in lowered position.

Fig. 6 is a vertical section of the truck and rear portion of the frame and handle bars.

Referring to the drawings, 1 and 2 represent two side rails forming the main frame of the implement, the rails being bent inwardly at their forward ends and connected together by a bolt 3. Near their forward ends the rails have bearing supports 4 for the single centrally-arranged carrying wheel 5, and back of the carrying wheel the rails have bolted thereto, respectively, the lower ends of the handle bars 6 and 7; these handle bars being further braced and supported by brace rods 8 and 9, rigidly secured, respectively, to the frame rails and handle bars, and also by a cross-rod 10; the upper ends of the brace rods 9 being attached to this cross rod and secured in position by nuts.

The truck frame proper consists of a flat bar bent to a U-shape to form a bottom rail 11 and vertical side rails 12 and 13, the side rails being connected together at a point mid-way their lengths by a U-shaped bar 14, the sides 14ª of which are bolted to the rails 12 and 13; a brace 15 being preferably interposed between the rails 11 and 14 and secured thereto by rivets. Two caster wheels 16 and 17, mounted in forked heads 18, support the parts; the heads having stems 19 and 20 which extend through and are journaled in the respective rails 11 and 14, cotter pins 21 serving to hold them in position.

The implement frame rails 1 and 2 each has connected to its rear end an upwardly and rearwardly extending bracket 22 and 23, the rear ends of said brackets being slidingly mounted upon the respective stems 19 and 20. Secured to the inner side of each handle bar is a plate 24 and 25, best shown in Fig. 6, bent laterally near its center to form a slotted opening, and through these slotted openings extend the side rails 12 and 13 of the truck frame, the rear edges of these rails having a series of notches 26. Pivotally connected to each plate is a catch 27, having a lower bent end which is normally pulled against its corresponding frame rail by a coil spring 28, having one end connected to the catch and the other to the rod 10 so as to engage in any one of the notches. Pivoted to the inner side of each of the handle bars is a trip lever 29 connected to its corresponding catch by a link 30.

Secured to the outer side of each of the truck side rails is a bracket 31, which brackets support a rock shaft 32, square in cross-section. Clamped to each end of the rock shaft is a forwardly extending lifter arm 33 and 34, one of which is shown in detail in Figs. 3 and 4. The outer free ends of these arms are connected by links 35 to the respective rails 1 and 2 of the implement frame. The inner side of each of these lifter arms has an extended hub 33ᵃ (Fig. 4) which is journaled in a bore 31ᵃ of its corresponding bracket 31 to form a bearing for each end of the rock shaft. The lifter arm 34 is extended rearwardly, as indicated at 34ᵃ and has attached thereto a foot lever 35.

The furrow openers are bolted to the rails 1 and 2 of the implement frame and the seed and fertilizer hoppers, together with the seeding devices, are also mounted thereon. If it is desired to raise the furrow openers from the ground, the operator grasps the trip levers 29 and releases the catches 27 and then presses down with his foot upon the lever 35, thus rocking the shaft 32 and lifting the main frame through the arms 33 and 34 and links 35, thereby lifting the furrow openers. By releasing the trip levers, the catches may be caused to engage the upper notches 26 and hold the parts in raised position, these catches and notches also serving to hold the furrow openers in different positions relatively to the ground to gage the depth of planting. In lowering the implement frame and parts carried thereby, the operator simply releases the catches, whereupon the parts drop by gravity.

By the construction described, a simple, compact and efficient truck is provided for an implement of the character referred to, the arrangement being such that the implement may be readily turned at the end of a row by raising the furrow openers from the ground so that the rear end of the implement frame may be swung sidewise in either direction. With the construction described, this sidewise movement is easily accomplished by reason of the fact that the caster wheels are so mounted that their stems will remain in a substantially perpendicular position at all times, allowing them to readily turn in their bearings to permit the wheels to follow the line of travel and permit the free movement of the implement in any direction; the implement being as readily swung sidewise when standing still as when traveling forward.

Maintaining the caster wheel stems in a substantially perpendicular position also tends to hold the implement steadier for the reason that flopping of the caster wheels from side to side due to uneven ground does not tend to alter the position of the implement frame relatively to the ground line.

By the arrangement of the rock shaft and foot lever described, the foot lever being at the side of the machine, it will be seen that the space occupied by the operator is clear from all operating parts, allowing for the free movement of the operator in the manipulation of the machine.

Having thus described my invention, I claim:—

1. In a machine of the character described, a truck frame; a caster wheel located at each side of said frame, stems for said caster wheels journaled in said truck frame and arranged to stand substantially perpendicular to the axes of said wheel, a main frame having its rear end slidably mounted on said stems, a supporting wheel for the forward end of said main frame, handle bars connected with said main frame and projecting to the rear of said truck frame, and means for raising and lowering said main frame and holding it in different positions of adjustment with respect to said truck frame.

2. In a machine of the character described, a truck frame; caster wheels one located at each side of said truck frame, stems for said caster wheels journaled in said truck frame and arranged to stand substantially perpendicular to the axes of said wheels, a main frame having its rear end slidably connected with said truck frame, a supporting wheel for the forward end of said main frame, handle bars connected with said main frame and projecting to the rear of said truck frame; a rock shaft supported by said truck frame, connections between said rock shaft and said main frame, and a foot lever connected to said rock shaft and operable from the rear side of said truck frame to raise said main frame.

3. In a machine of the character described, a truck frame, a caster wheel located at each side of said truck frame, stems for said caster wheels journaled in said truck frame and arranged substantially perpendicular to the axes of said wheels, a main frame having the rear end thereof slidably mounted on said stems, a supporting wheel for the forward end of said main frame, handle bars connected with said main frame and projecting to the rear of said truck frame, a rock shaft mounted on said truck frame having connections with said main frame, and a foot lever connected to said rock shaft and operable from the rear of said truck frame to raise said main frame.

4. In a machine of the character described, a truck frame, a caster wheel located at each side of said truck frame for supporting the same, a main frame having the rear end thereof movably connected with said truck frame, a supporting wheel for the forward end of said main frame, handle bars connected with said main frame and projecting to the rear of said truck frame, a foot lever supported by said truck frame at one side thereof and operable from the rear of said truck frame, and connections between said foot lever and said main frame for raising the same.

5. In a machine of the character described, a truck frame, caster wheels for supporting the same, a main frame, handle bars connected with said main frame, said main frame and handle bars being slidably connected with said truck frame, a foot lever on said truck frame connected with said main frame for raising the same, and catches carried by said handle bars to engage said truck frame to hold said main frame in different positions of adjustment with respect to said truck frame.

6. In a machine of the character described, a truck frame, caster wheels for supporting the same, a main frame, handle bars connected with said main frame, said main frame and handle bars being slidably connected with said truck frame, a rock shaft on said truck frame, connections from said rock shaft to said main frame, a foot lever connected with said rock shaft for raising said main frame, and catches carried by said handle bars to engage said truck frame to hold said main frame in different positions of adjustment with respect to said truck frame.

7. In a machine of the character described, a truck frame, caster wheels for supporting the same having stems journaled in said truck frame, a main frame, handle bars connected with said main frame, the rear end of said main frame and handle bars being slidably connected with said truck frame, a carrying wheel for the forward end of said main frame, a foot lever on said truck frame connected with said main frame for raising the same and the handle bars, and catches carried by said handle bars to engage said truck frame to hold said main frame in different positions of adjustment with respect to said truck frame.

8. In a machine of the character described, a truck frame, caster wheels for supporting the same having stems journaled in said truck frame, a main frame, handle bars connected to said main frame, the rear end of said main frame being slidably mounted upon said stems and said handle bars having a slidable connection with the sides of said truck frame, a carrying wheel for the forward end of said main frame, a rock shaft carried by said truck frame pivotally connected with said main frame, a foot lever connected with said rock shaft for raising said main frame, and catches carried by said handle bars to engage the sides of said truck frame to hold said main frame and handle bars in different positions of adjustment with respect to said truck frame.

9. In a machine of the character described, a truck frame having vertically arranged sides, caster wheels for supporting the same having stems journaled in said truck frame, a main frame having its rear end slidably mounted upon said stems, a carrying wheel for supporting the forward end of said main frame, handle bars rigidly connected to said main frame and slidably mounted upon the sides of said truck frame, a rock shaft carried by said truck frame, lifter arms connected with said rock shaft, links connecting said lifter arms with said main frame, a foot lever connected with said rock shaft, and catches carried by said handle bars for engaging notches in the sides of said truck frame.

In testimony whereof I have hereunto set my hand this 25th day of August, 1919.

ELMER E. TOWLE.

Witnesses:
O. L. LOAFBOURROW,
G. M. KRIEGBAUM.